United States Patent [19]
Aoki

[11] Patent Number: 5,946,755
[45] Date of Patent: Sep. 7, 1999

[54] SHOES AND PROCESS FOR PRODUCING SAME

[75] Inventor: Minoru Aoki, Tokyo, Japan

[73] Assignee: Aoki Safety Footwear Co., Ltd, Yamagata, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/756,758

[22] Filed: Nov. 26, 1996

[51] Int. Cl.⁶ .................................................. A43D 11/00
[52] U.S. Cl. ................................ 12/142 RS; 12/146 BR; 12/142 T
[58] Field of Search ........................ 12/146 BR, 142 RS, 12/142 T, 142 E, 142 EV; 36/12, 14

[56] References Cited

U.S. PATENT DOCUMENTS

| | | | |
|---|---|---|---|
| 1,479,497 | 1/1924 | Cutler | 36/14 |
| 1,955,720 | 4/1934 | Rollmann | 36/14 |
| 2,129,106 | 9/1938 | Szerenyi et al. | 36/14 |
| 2,574,582 | 11/1951 | Rollman | 36/14 |
| 2,580,245 | 12/1951 | Rollman et al. | 36/14 |
| 3,074,185 | 1/1963 | Hansjosten | 36/14 |
| 3,270,358 | 9/1966 | Milner | 12/142 RS |

FOREIGN PATENT DOCUMENTS

| | | | |
|---|---|---|---|
| 35 No. 13127 | 9/1960 | Japan . | |
| 1-No. 44084 | 12/1989 | Japan . | |
| 2307-402 | 12/1990 | Japan | 12/142 RS |
| 4017-803 | 1/1992 | Japan | 12/142 RS |
| 6-7202 | 1/1994 | Japan | 12/142 RS |
| 6 No. 155646 | 6/1994 | Japan . | |
| 6 No. 36725 | 9/1994 | Japan . | |

*Primary Examiner*—M. D. Patterson
*Attorney, Agent, or Firm*—Darby & Darby

[57] ABSTRACT

In a safety shoe provided with a toecap, a vamp, an insole, and a two-layer structure sole, the a two-layer structure sole includes an outsole part comprising a high hardness rubber material and a midsole part, laminated in the above outsole part, comprising a low hardness sponge rubber material and has a heel part. The outsole part is fused integrally with the midsole part by vulcanization molding, and the upper circumferential edge of the outsole part is fused integrally with the lower circumferential edge of the vamp by the vulcanization molding described above. Since the outsole part in a side in contact with the ground has a high physical strength and is excellent in an oil resistance, a chemical resistance and a heat resistance, and the midsole part in an inner side has a cushioning property, the shoe is less liable to bring about fatigue even after wearing it for a long period of time. Further, a weight of the whole safety shoe can be lightweight, and a durability of the whole safety shoe can be elevated.

4 Claims, 10 Drawing Sheets

SHOES AND PROCESS FOR PRODUCING SAME

BACKGROUND OF THE INVENTION (1) Field of the Invention

The present invention relates to shoes and a process for producing the same, more specifically to shoes having a sole of a two-layer structure such as safety shoes and sport shoes and a process for producing the same.

(2) Description of the Related Art

In general, safety shoes are divided, depending on a difference in sole materials, broadly into synthetic rubber sole safety shoes using synthetic rubber for the material and foamed polyurethane sole safety shoes using foamed polyurethane for the material.

The synthetic rubber sole safety shoes have the advantages that they do not have a hydrolytic property and that they have a high physical strength and are excellent in an oil resistance, a chemical resistance and a heat resistance, and therefore they are suitable to be used in the fields of the iron and steel industry, the mining industry, the construction industry, the chemical handling industry, and the like, in which heat, chemicals (acids, alkalis, and solvents) and oils are handled in large quantities, and working conditions are relatively severe. However, the synthetic rubber sole safety shoes are inferior in lightweight and a cushioning property (shock absorbing property) which are the most important in terms of an easiness in wearing, and have the defect that they are liable to bring about fatigue after wearing them over a long period of time.

In contrast with this, the foamed polyurethane sole safety shoes have lightweight and a cushioning property (shock absorbing property) which are the most important in terms of an easiness in wearing, and have the advantage that they cause little fatigue even after wearing them over a long period of time. However, they have the defects that they have a hydrolytic property and a low physical strength and are inferior in an oil resistance and a chemical resistance and that they have a low heat resistance and are liable to be scratched.

In recent years, an easiness in wearing tends to be regarded as being important also in requirements to safety shoes, and demand to the foamed polyurethane sole safety shoes is increasing. Under such circumstances, various improvements have been made in order to modify the preceding defects of the foamed polyurethane sole safety shoe.

Known as such shoes are, for example, foamed polyurethane two-layer structure sole safety shoes (Japanese Utility Model Publication No. Hei 1-44084) in which a large part of a heel is composed of polyurethane having a high foaming rate and a soft cushioning property, and a circumference thereof is covered with polyurethane having a low foaming rate, and a lower circumference of a vamp is covered with a thin sheet formed out of polyurethane having a high foaming rate, so that the heel is provided with a high cushioning property, and the effect of preventing the vamp from peeling off from the polyurethane sole can be provided.

Further, known as well are two-layer safety shoes (Japanese Utility Model Publication No. Hei 6-36725) in which a rubber material having a high abrasion resistance and a high oil resistance is used in part of a sole, and the other part of the sole is formed out of a flexible polyurethane material.

However, since the foamed polyurethane two-layer structure sole safety shoes disclosed in Japanese Utility Model Publication No. Hei 1-44084 described above is just made of foamed polyurethane, they have the problems that temperatures in the inside of the shoes are elevated during use due to a heat accumulating property which is a characteristic of polyurethane, and therefore that the inside of the shoes is liable to be hot and humid, and the shoes are liable to be scratched. Also, the foamed polyurethane two-layer structure sole safety shoes are susceptible to hydrolysis as compared with the synthetic rubber safety shoes and are inferior thereto in an oil resistance, a heat resistance and a chemical resistance, and therefore they still have a problem in terms of less durability. Further, they have a problem that use at a place where working conditions are relatively severe is restricted.

Since the safety shoes described in Japanese Utility Model Publication No. Hei 6-36725 employ foamed polyurethane as a flexible material, they have the same problems as those described above, that is, the problems that the shoes are liable to be hot and humid in the inside thereof and are liable to be scratched and that they are inferior to the rubber ones in durability and are restricted in use. Further, since the shoes are produced after forming a grounding plate with projections and a thin plate with windows in order to form the sole, they have many number of parts and dead parts and have many problems in terms of workability and cost.

Accordingly, synthetic rubber and foamed polyurethane safety shoes have the advantages and disadvantages as described above at present, and therefore the existing state is that the optimum safety shoes are suitably selected in light of the characteristics of both and use conditions. Desired are safety shoes endowed with the characteristics of both all together, that is, safety shoes which have no hydrolytic property, a high physical strength, an excellent oil resistance, chemical resistance and heat resistance, lightweight, and a cushioning property (shock absorbing property), and are less liable to bring about fatigue even after wearing them over a long period of time and which are less liable to be hot and humid in the inside thereof and to be scratched and have a good working efficiency as well as are capable of being produced at a low cost.

On the other hand, rubber sheet materials for a sole prepared by putting a sponge blend composition and a solid blend composition together to integrally mold them at the same time have recently been known (Japanese Patent Publication No. Sho 35-13127 and Japanese Patent Application Laid-Open No. Hei 6-155646).

The materials disclosed in Japanese Patent Publication No. Sho 35-13127 and Japanese Patent Application Laid-Open No. Hei 6-155646 have something partially in common with the present invention, but the above materials are the rubber sheet materials for a sole. Accordingly, in order to produce footgears having sheet-shaped soles and the like from these materials, there has to be employed a troublesome method in which sheet-shaped soles are first prepared, and then the above sole and a vamp are put together by adhesion, sewing means or the like, and since the above method is not directed to producing footgears having sheet-shaped soles by integrally molding, it has the problems that the working efficiency in the production steps is poor, leading to an increase in the cost.

As apparent from descriptions in these specifications, only sheet-shaped products having as small thickness as 0.5 to 5 mm can be produced in a sponge part and a solid part due to a difference in an expansion coefficient, influence exerted by foam gas, and a difference in vulcanizing time between the sponge part and the solid part. Products having a larger thickness than the range described above are liable to cause warp and detachment of the two layers due to a difference in an expansion coefficient, and influence exerted by foam gas and the like as described above, and therefore they cannot be applied to shoes having thick soles provided with heels, and safety shoes. In addition, there are many problems that soles having no specified physical properties are produced due to a difference in vulcanizing time between a sponge part and a solid part, and therefore insufficiently qualified sole products are produced.

SUMMARY OF THE INVENTION

It is an object of the present invention to solve various conventional problems described above and provide shoes having no hydrolytic property and a high physical strength, excellent in durability such as an oil resistance, a chemical resistance and a heat resistance, further having lightweight and a cushioning property (shock absorbing property), less liable to bring about fatigue even after wearing them over a long period of time, less liable to be hot and humid and to be scratched, having a good working efficient in the production steps, capable of being produced at a low cost, and provided with a two-layer structure sole having a heel and the like, and a production process for the same.

Intensive investigations made by the present inventor in order to solve the conventional problems described above have resulted in successfully obtaining a shoe which is provided with a sole of a two-layer structure composed of a rubber material having a high hardness and a sponge rubber material having a low hardness by a specific molding method and meets the object described above, and thus completing the present invention.

According to an aspect of the present invention, provided is a shoe which comprises a vamp; a two-layer structure sole including an outsole part comprising a high hardness rubber material and a midsole part comprising a low hardness sponge rubber material laminated in the outsole part, the two-layer structure sole having a heel part in which the midsole part is made thick; and an insole part laminated on the two-layer structure sole, wherein the outsole part is fused integrally with the midsole part by vulcanization molding, and the upper circumferential edge of the outsole part or midsole part is fused integrally with the lower circumferential edge of the vamp by the vulcanization molding.

The shoe having the arrangement described above does not have a hydrolytic property and a heat accumulating property and is less liable to be scratched as is the case with a polyurethane material. Further, since the outsole part on a side in contact with the ground is composed of a rubber material having a high hardness, it has a high physical strength and is excellent in an oil resistance, a chemical resistance, a heat resistance and the like. In addition thereto, since the midsole part on an inner side is composed of a sponge rubber material having a low hardness, it has a cushioning property (shock absorbing property) and causes little fatigue even after wearing it over a long period of time. Also, a weight of the whole shoe can be lightweight. Further, since the outsole part is fused integrally with the midsole part by the vulcanization molding described above, and the upper circumferential edge of the outsole part or midsole part is fused integrally with the lower circumferential edge of the vamp by the vulcanization molding described above, the shoe has a peeling prevention effect, and a durability of the whole shoe can be increased.

In the arrangement described above, it is effective that the upper circumferential edge of the outsole part is fused integrally with the lower circumferential edge of the vamp through a circumferential member comprising a high hardness rubber material by the vulcanization molding, and the midsole part of the heel part is provided with a plurality of through holes.

The vamp can further firmly be fixed on the outsole part by fusing the upper circumferential edge of the outsole part integrally with the lower circumferential edge of the vamp through the circumferential member comprising the high hardness rubber material by the vulcanization molding, and therefore peeling can further be prevented. In addition thereto, since the midsole part of the heel part is composed thickly of a sponge rubber material having a low hardness and is provided with a plurality of though holes, the cushioning property (shock absorbing property) can further be raised, and a hot and humid condition can be prevented.

The shoe described above is preferably a safety shoe having a toecap. That is, a safety shoe which solves the respective problems in conventional synthetic rubber and foamed polyurethane safety shoes and is endowed only with the advantages of both can be prepared.

According to another aspect of the present invention, provided is a process for producing a shoe which comprises the steps of: sticking an unvulcanized foamed rubber sheet for a midsole part comprising a low hardness sponge rubber material to the back face of a gas permeable material provided on the whole back face of a vamp to prepare the vamp provided with the unvulcanized rubber sheet for the midsole part; semi-vulcanizing an unvulcanized rubber sheet comprising a high hardness rubber material in a die to mold the unvulcanized rubber sheet into a semi-vulcanized rubber sheet for an outsole part; and superposing the vamp provided with the unvulcanized rubber sheet for the midsole part on the semi-vulcanized rubber sheet for the outsole part in the die to conduct the vulcanization molding, wherein in the vulcanization molding step, a two-layer structure sole which includes the outsole part comprising the high hardness rubber material and the midsole part comprising the low hardness sponge rubber material laminated in the above outsole part and which has a heel part is integrally molded by fusing each other, and the upper circumferential edge of the outsole part or midsole part and the lower circumferential edge of the vamp are integrally molded by fusing each other.

According to the process for producing the shoe having the arrangement described above, since a difference in an expansion coefficient between the outsole part and the midsole part and a difference in vulcanizing time therebetween are canceled by using the semi-vulcanized rubber sheet for the outsole part which is prepared by semi-vulcanizing the unvulcanized rubber sheet comprising the rubber material having a high hardness in the die, and the foam gas generated in vulcanization-molding is dispersed via the gas permeable material provided on the whole back face of the vamp. As a result, a peeling phenomenon of the outsole part from the midsole part caused by the foam gas can be prevented, and the outsole part and the midsole part remain closely fused each other. In addition thereto, the upper circumferential edge of the outsole part or midsole part is fused with the lower circumferential edge of the vamp by vulcanization molding, and therefore the shoe provided with a sole having a two-layer structure can be produced only by vulcanization molding. Accordingly, the working efficiency in the production steps is excellent, and the shoe can be produced at a low cost.

The preceding process for producing a shoe is preferably a process for producing a safety shoe provided with a toecap.

That is, a safety shoe endowed with only the advantages of both conventional synthetic rubber and foamed polyurethane safety shoes can be produced at a good working efficiency in the production steps at a low cost.

Further, advantages and features of the present invention as well as the scope, nature and utilization of the present invention shall become apparent to the averagely skilled in the art from the descriptions of the preferred embodiments of the present invention set forth below.

DESCRIPTION OF THE PREFERRED EMBODIMENTS

The details of the present invention shall be explained below.

The rubber material having a high hardness for the outsole part or circumferential member (hereinafter referred to as "for the outsole part etc.") used in the present invention is used for a ground face side and therefore is a rubber material which has a high physical strength and is excellent in an oil resistance, a chemical resistance, a heat resistance and the like.

There can be used as the rubber material having a high hardness, nitrile butadiene rubber (NBR), styrene butadiene rubber (SBR), polybutadiene rubber (BR), chloroprene rubber (CR), mixed synthetic rubbers thereof, mixed rubbers of these synthetic rubbers with natural rubber (NR), mixed rubbers of these synthetic rubbers with polyisoprene rubber (IR), or the like, in which a JIS (A) hardness thereof after vulcanization is 50 (HS) or more.

The sponge rubber having a low hardness for the midsole part used in the present invention is used for an inner face side, and therefore a rubber material having a large cushioning property (shock absorbing property) is used.

Used as this sponge rubber material having a low hardness is a foamed rubber material prepared by blending a compounding agent such as organic foaming agents for rubber, inorganic foaming agents and foaming aids into the preceding various rubber materials for the outsole part etc. The foaming agent is decomposed at vulcanizing temperatures according to the kind of the blended foaming agent to release gas, whereby sponge rubber having continuous bubbles or independent bubbles is prepared.

With respect to the preceding rubber materials for the outsole part etc. and the midsole part, the optimum rubber materials can be used in combination, respectively, according to uses such as sport shoes and safety shoes. In the case of using, for example, nitrile butadiene rubber (NBR) for the outsole part etc., foamed nitrile butadiene rubber having the same physical properties is preferably used as rubber for the midsole part. Fusion of the outsole part with the midsole part by vulcanization molding is further improved by using rubbers having the same physical properties with regard to the rubber materials for the outsole part etc. and the midsole part.

Blended, if necessary, to these rubber materials for the outsole part etc. and the midsole part are compounding agents for rubber such as fillers, cross-linking agents, antioxidants, softening agents, vulcanization accelerators, vulcanization accelerator aids, activators, colorants including pigments, dispersants, and processing aids, and then vulcanization molding is carried out.

Also, there may be blended, if necessary, to the rubber materials for the outsole part etc. and the midsole part, publicly known curing agents, conductive agents, insulating agents, heat resistant agents, flame retardants and the like. Further, publicly known deodorants, bactericides, and fragrances may be blended, if necessary, to the rubber materials for the midsole part.

Next, there shall be explained an embodiment of a shoe of the present invention with reference to FIG. 1 to FIG. 9 and an embodiment of the process for producing a shoe of the present invention with reference to FIG. 10 to FIG. 14.

Figure 1:
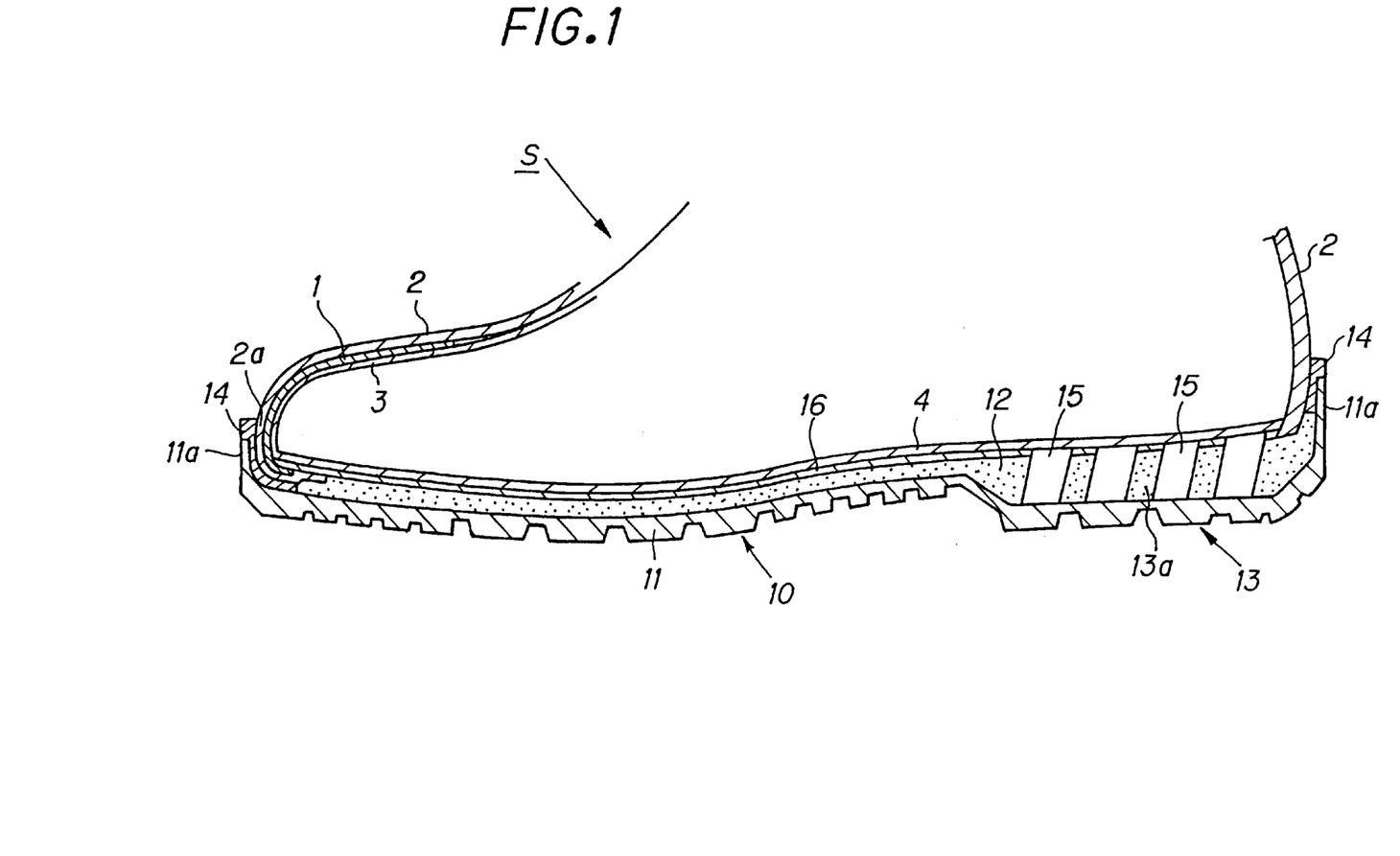
FIG. 1 is a partial longitudinal cross-sectional view showing a safety shoe according to an embodiment of the shoe of the present invention.
Figure 2:
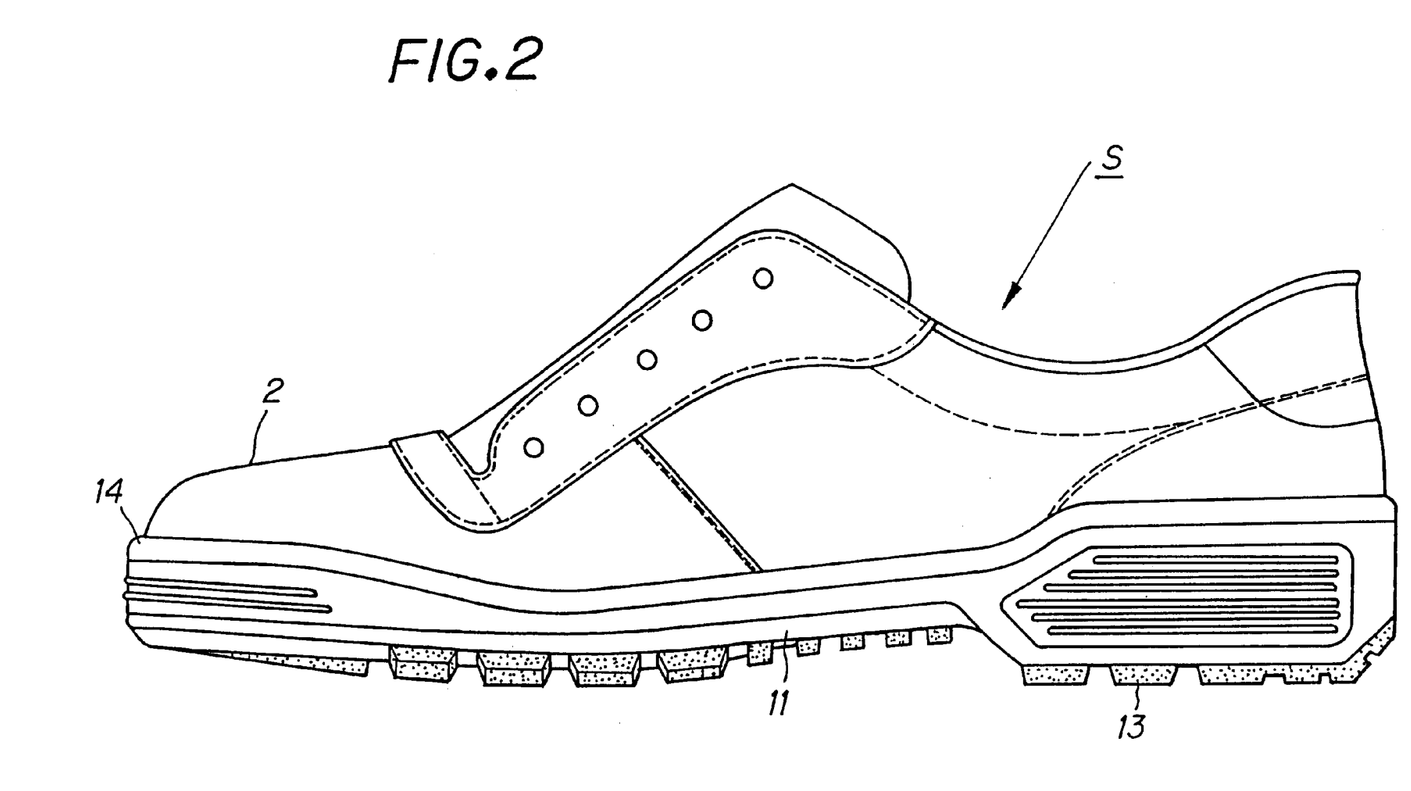
FIG. 2 is a side view showing the safety shoe of FIG. 1.
Figure 3:
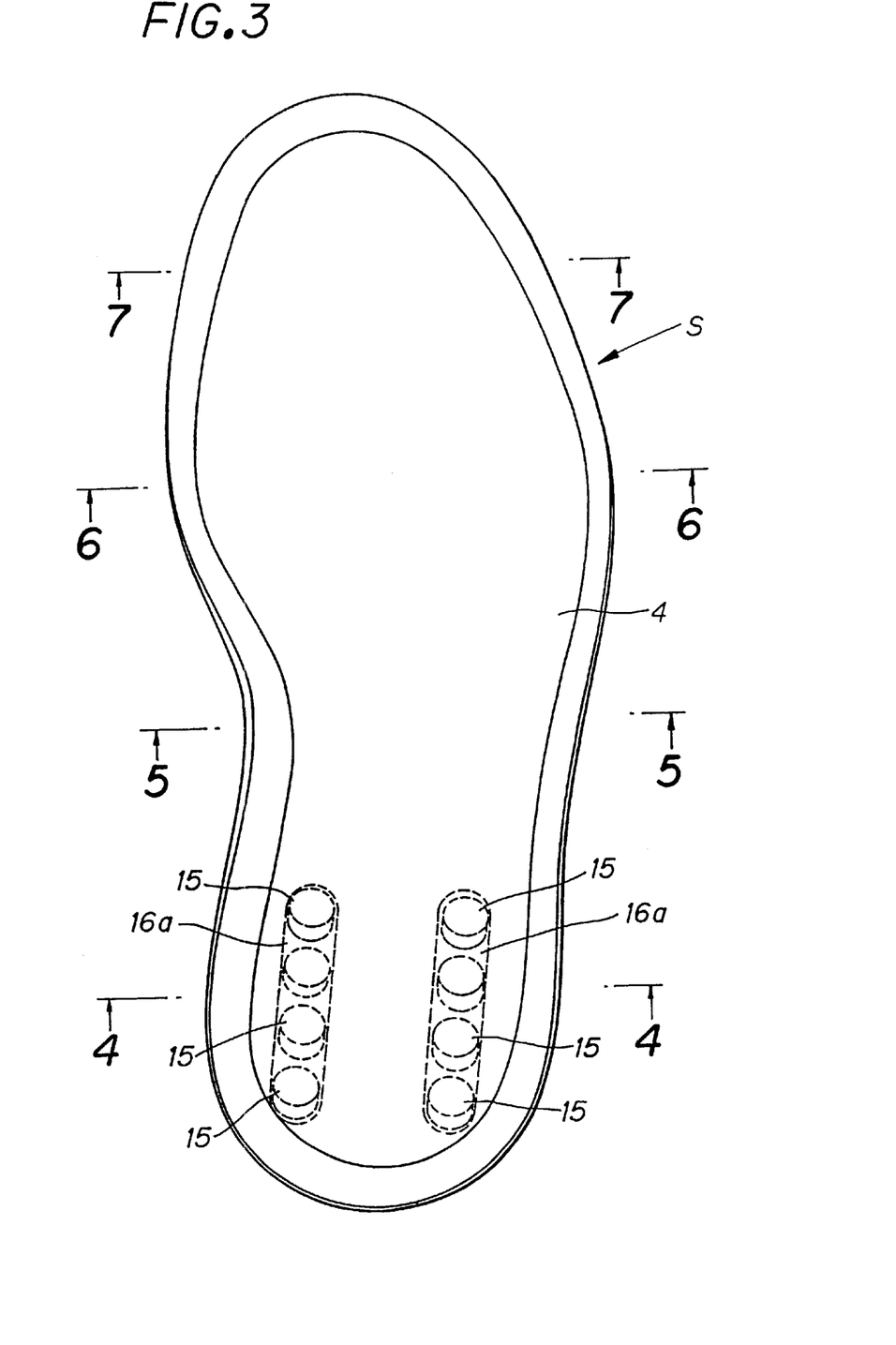
FIG. 3 is a plan view showing the safety shoe of FIG. 1.

FIG. 1 to FIG. 9 show an embodiment in which the shoe of the present invention is applied to a safety shoe, wherein FIG. 1 is a partial cross-sectional view showing a principal part; FIG. 2 is a side view; FIG. 3 is a plan view; FIG. 4 to FIG. 7 are cross-sectional views taken along A—A line, B—B line, C—C line and D—D line in FIG. 3, respectively; FIG. 8A and B are an enlarged side view of a rear part of a safety shoe and a cross-sectional view taken along E—E line; and FIGS. 9A and B are an enlarged side view of a front part of the safety shoe and a cross-sectional view taken along F—F line.

In the drawings, S represents the safety shoe of the present embodiment; 1 represents a toecap which is characteristic of the safety shoe; 2 represents a vamp; 3 represents a back cloth; 4 represents an insole; and 10 represents a two-layer structure sole.

As shown in FIG. 1 to FIG. 7, the two-layer structure sole 10 is provided with a heel part and comprises an outsole part 11 comprising a rubber material which has a high hardness and is excellent in an oil resistance, a chemical resistance, a heat resistance and the like, and a midsole part 12 comprising a sponge rubber material of a low hardness laminated in the upper circumferential edge 11a of the above outsole part 11. The outsole part 11 and the midsole part 12 comprise the rubber material and the sponge rubber material each having the physical properties described above, respectively, other than a polyurethane material. The outsole part 11 and the midsole part 12 are integrally fused by vulcanization molding.

As shown in FIG. 1 and FIG. 4 to FIG. 9, the upper circumferential edge 11a of the outsole part 11 is fused integrally with the lower circumferential edge 2a of the vamp 2 via a circumferential member 14 comprising a rubber material having a high hardness by the vulcanization molding, and the midsole part 12 in the heel part 13 described above is thickly composed of a sponge rubber material having a low hardness and provided with a plurality of though holes 15, 15 - - - .

Figure 8A:
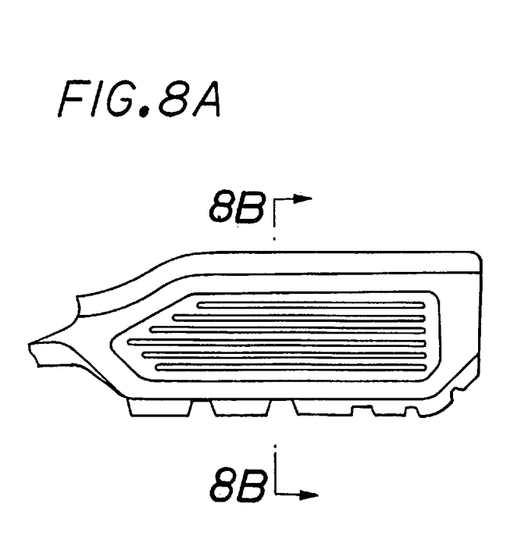
FIG. 8A is an enlarged side view of a rear part of the safety shoe shown in FIG. 2.
Figure 8B:
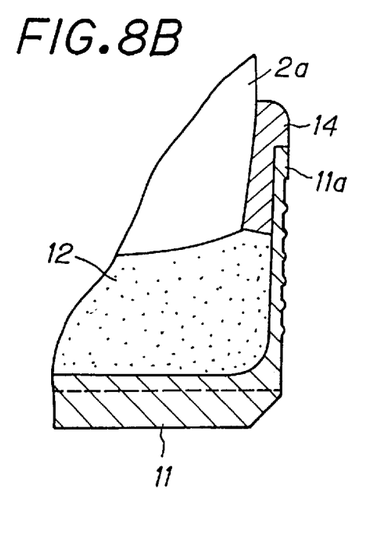
FIG. 8B is a cross-sectional view taken along E—E in FIG. 8A.
Figure 9A:
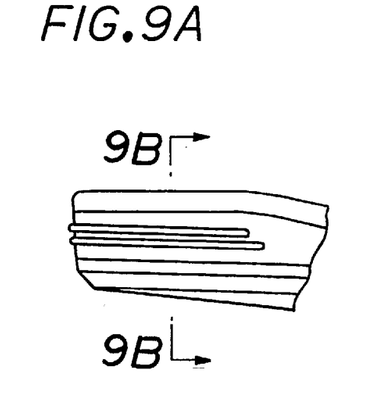
FIG. 9A is an enlarged side view of a front part of the safety shoe shown in FIG. 2.
Figure 9B:
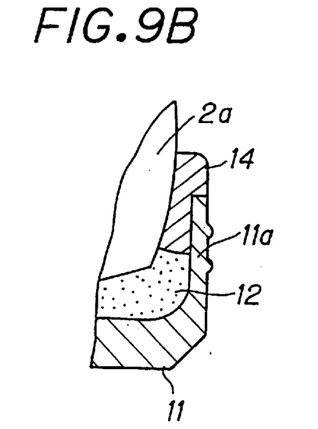
FIG. 9B is a cross-sectional view taken along F—F in FIG. 9A.

The outsole part 11 in the present embodiment has a thickness of 2 mm in a thin part and about 15 mm in a thick part, and the midsole part 12 has a thickness of 4 mm in a thin part and about 20 mm in a thick part (FIG. 8B).

Also, 16 represents a gas permeable material and disperses foam gas generated in vulcanization molding. Accordingly, the gas permeable material 16 has many fine pores sufficient for dispersing the foam gas and is made of cloth or non woven fabric which is durable against vulcanizing temperatures.

Since the safety shoe of the present embodiment thus constituted is provided with the two-layer structure sole 10 comprising the rubber material and sponge rubber material having the physical properties described above other than a polyurethane material, the safety shoe does not have a hydrolytic property and a hot and humid state attributable to a heat accumulating property and is less liable to be scratched unlike a polyurethane material. In addition thereto, since the outsole part 11 in a ground face side comprises a rubber material having a high hardness, it has a high physical strength and is excellent in an oil resistance, a chemical resistance, a heat resistance and the like.

Also, the midsole part 12 in an inner face side comprises a sponge rubber material having a low hardness, and therefore it has a cushioning property (shock absorbing property) and is less liable to bring about fatigue even after wearing it over a long period of time. In addition, a weight of the whole shoe can be decreased by 20% or more as compared with those of conventional synthetic rubber safety shoes having a single layer structure sole. Further, since the outsole part 11 is fused with the midsole part 12 by vulcanization molding, and as shown in FIG. 1, FIG. 8, FIG. 9 and FIG. 15, the upper circumferential edge 11a of the outsole part 11 is fused integrally with the lower circumferential edge 2a of the vamp 2 via the circumferential member 14 comprising a rubber material having a high hardness by the vulcanization molding described above, the effect of preventing the lower circumferential edge 2a of the vamp 2 from peeling off from the sole 10 is provided, and a durability of the whole shoe can be elevated.

Figure 4:
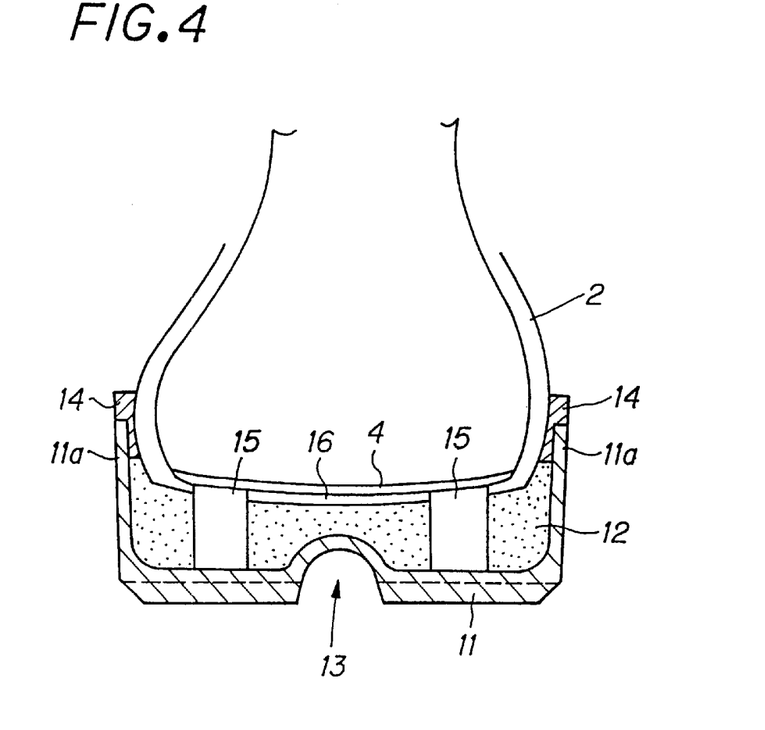
FIG. 4 is a cross-sectional view taken along A—A in FIG. 3.
Figure 5:
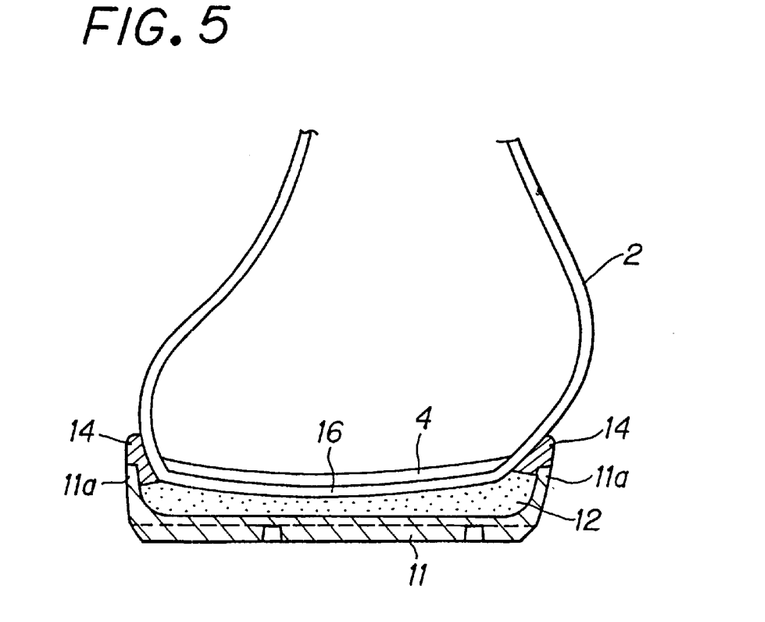
FIG. 5 is a cross-sectional view taken along B—B in FIG. 3.
Figure 6:
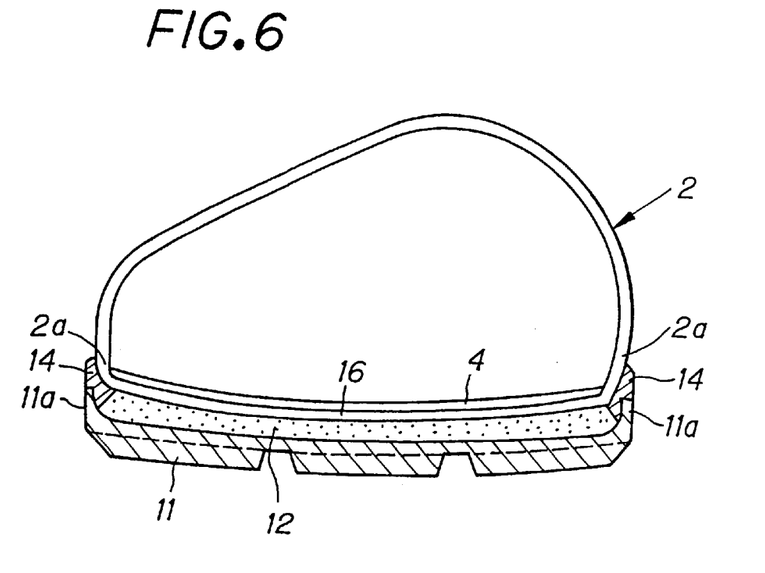
FIG. 6 is a cross-sectional view taken along C—C in FIG. 3.
Figure 7:
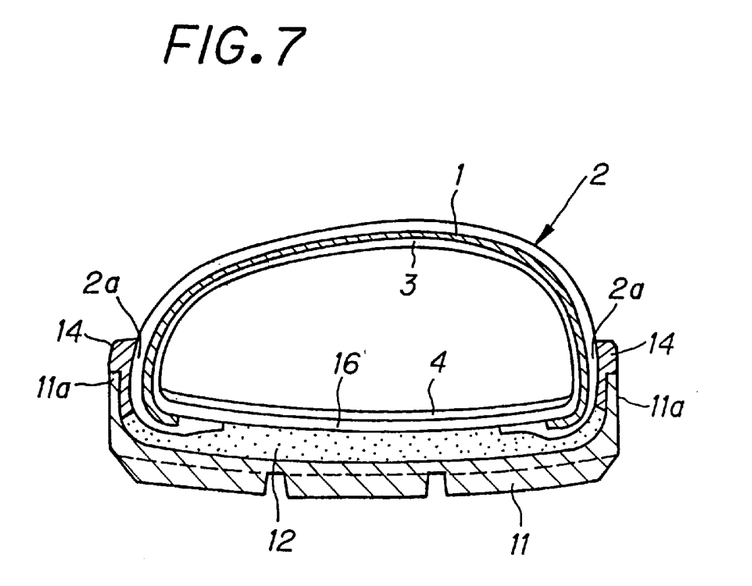
FIG. 7 is a cross-sectional view taken along D—D in FIG. 3.

Further, as shown in FIG. 1 and FIG. 4, the midsole part 12 in the heel part 13 described above is thickly composed of a sponge rubber material having a low hardness and is provided with a plurality of though holes 15, 15 - - - in the sponge rubber material part 13a corresponding to the heel part 13, and therefore the cushioning property (shock absorbing property) can further be elevated. In addition, since the plurality of the though holes 15, 15 - - - have a pump action given by walking, a flow of the air in the shoe is improved, and a hot and humid state can be prevented furthermore.

An embodiment of the process for producing a shoe of the present invention is shown in FIG. 10 to FIG. 14. The production process according to the present embodiment is carried out by means of a shoe-molding die apparatus 20 shown in FIG. 10 to FIG. 12 to produce the shoe.

Figure 10:
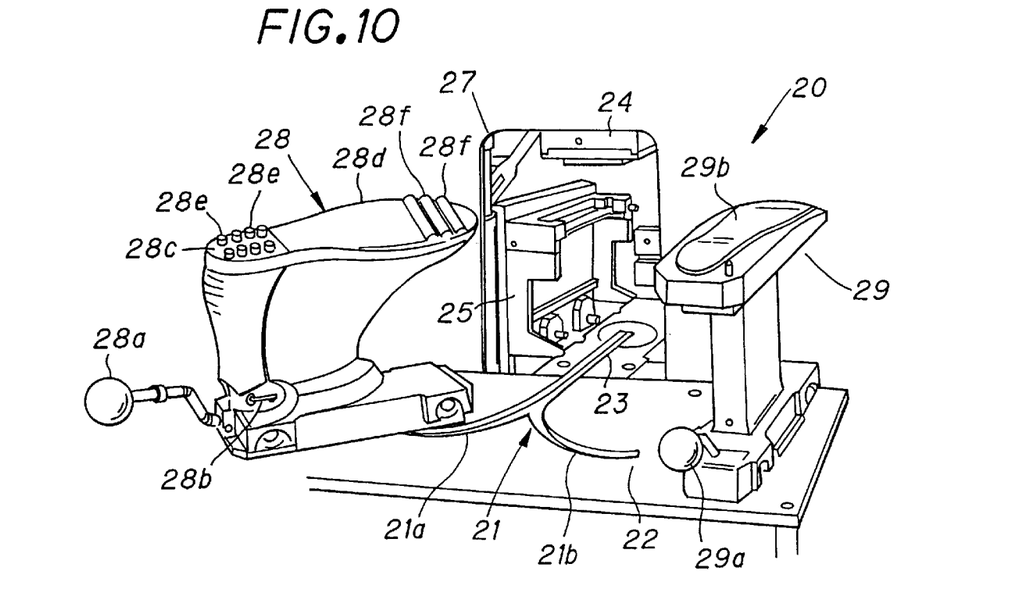
FIG. 10 is a perspective view showing an example of a shoe-molding die apparatus used in the process for producing a shoe of the present invention.
Figure 11:
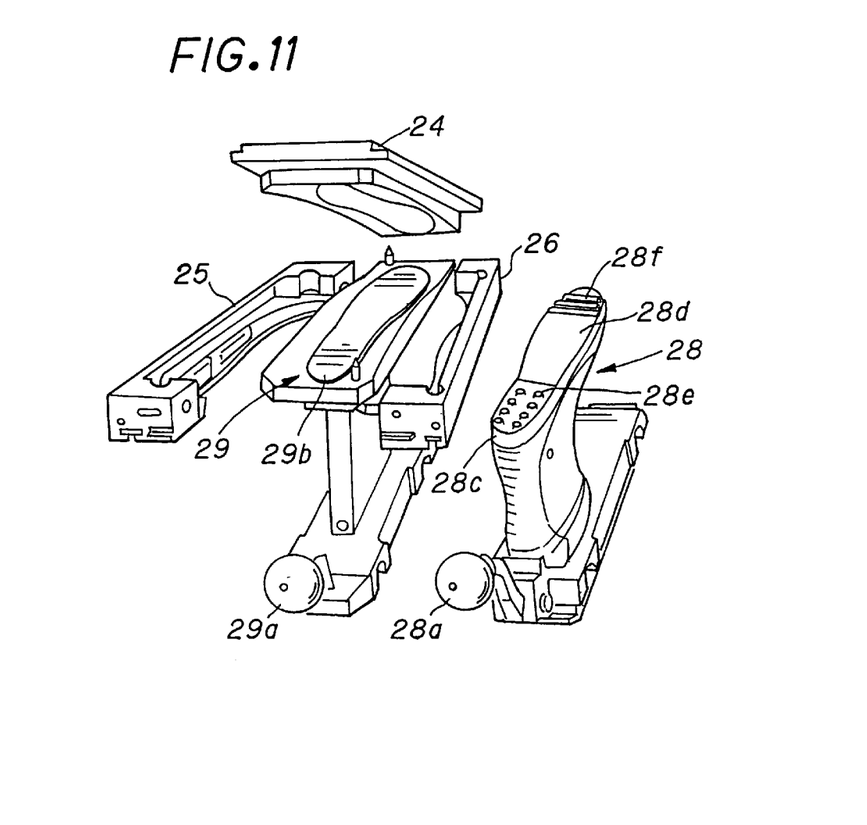
FIG. 11 is a principal part-exploded perspective view showing the shoe-molding die apparatus shown in FIG. 10.
Figure 12:
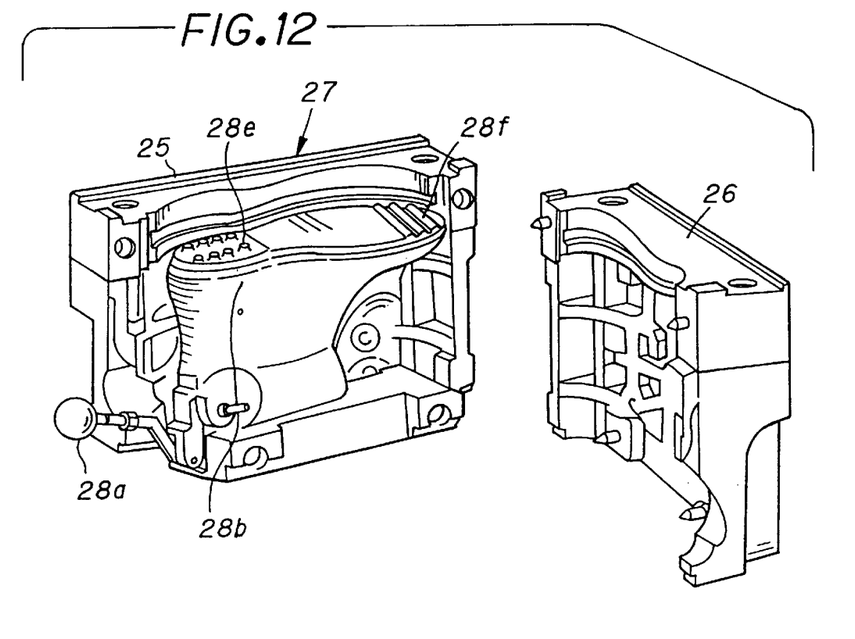
FIG. 12 is a principal part-exploded perspective view for explaining a use condition of the shoe-molding die apparatus shown in FIG. 10.

As shown in FIG. 10 to FIG. 12, the shoe-molding die apparatus 20 comprises a base table 22 provided with a guiding path 21 having branch paths 21a, 21b, a guiding part 23 connected with the above base table 22, an up and down movable upper die body 24, a die part 27 having right and left die bodies 25, 26 separated to right and left, a last 28 mounted to the branch path 21a described above, and a dummy last 29 for the outsole part mounted to the branch path 21b described above.

The last 28 has an operating part 28a and is designed to be freely separable into a heel part 28c and a front part 28d by means of a hinge part 28b so that the vamp 2 and the like attached can readily be detached. The heel part 28c is provided with a plurality of projections 28e, 28e - - - for carrying out certainly rubber vulcanization of the heel part 13 which is to be thickly composed of the rubber material, and the front part 28d is provided with gas guiding paths 28f, 28f - - - for dispersing foam gas. The last 28 is provided with a built-in heating element in the inside thereof, whereby provided is a structure in which upper parts of the heel part 28c and the front part 28d and the projections 28e, 28e are heated up to vulcanizing temperatures.

Also, the dummy last 29 for the outsole part is provided with an operating part 29a and a fitting part 29b, and the above dummy last 29 is provided with a built-in heating element in the inside thereof, whereby provided is a structure in which the above fitting part 29b is heated up to vulcanizing temperatures.

The production process related to the present embodiment is carried out by means of the shoe-molding die apparatus 20 constituted as described above.

Respective rubber materials having the blend ratios shown in the following Table 1 were used as the unvulcanized rubber sheet for the outsole part comprising a rubber material having a high hardness, the circumferential member, and the unvulcanized rubber sheet for the midsole part comprising a sponge rubber material having a low hardness.

TABLE 1

| (Blend ratios of the unvulcanized rubbers) | | | |
|---|---|---|---|
| | Rubber material with a high hardness (parts by weight) | | Sponge rubber material with a low hardness (parts by weight) |
| | Outsole part | Circumferential element | |
| NBR | 80 | 80 | 30 |
| NV (NBR/PVC) | 20 | 20 | 40 |
| NR | — | — | 30 |
| Carbon black | 50 | 30 | 10 |
| White filler | 20 | 20 | 40 |
| Plasticizer | 15 | 15 | 20 |

TABLE 1-continued (Blend ratios of the unvulcanized rubbers)

| | Rubber material with a high hardness (parts by weight) | | Sponge rubber material with a low hardness (parts by weight) |
|---|---|---|---|
| | Outsole part | Circumferential element | |
| Sulfur | 2 | 1.7 | 1.5 |
| Vulcanization accelerator | 2 | 2 | 2 |
| Foaming agent | — | — | 3 |
| Foaming aid | — | — | 3 |
| total | 189 | 168.7 | 179.5 |

Figure 13A:
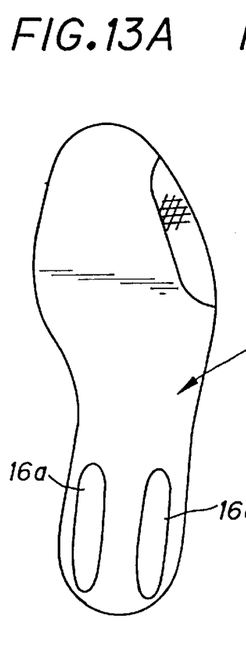
FIG. 13A is a plan view showing a gas permeable material drawn into a vamp used in the present invention.

In the production process according to the present embodiment, first, the vamp 2 provided on the whole back face thereof with a gas permeable material 16 is drawn into the last 28 shown in FIG. 10. As shown in FIG. 13A, the above gas permeable material 16 is provided with two lines of long openings 16a, 16a which are to be inserted into the projections 28e, 28e of the last 28, so that drawing thereof is facilitated.

Figure 13B:
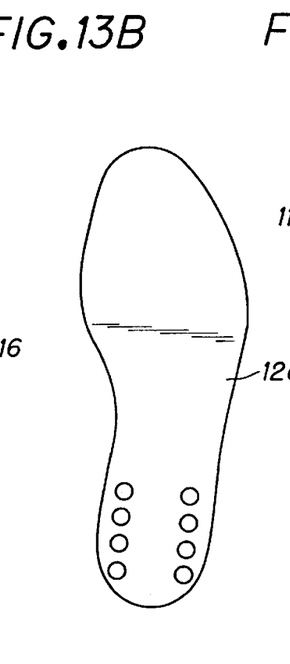
FIG. 13B is a plan view showing an unvulcanized foamed rubber sheet for a midsole.

Then, as shown in FIG. 13B, an unvulcanized foamed rubber sheet 12a for the midsole part comprising a sponge rubber material having a low hardness and provided with the openings which are to be inserted into the projections 28e, 28e is stuck on the back face of the gas permeable material 16 drawn.

This unvulcanized foamed rubber sheet 12a for the midsole part has a reduced form taking expansion (foaming) after vulcanization into consideration. In addition thereto, the unvulcanized foamed rubber sheet for the midsole part in which only the heel part is molded thickly in order to constitute the heel part thickly is used in the form of one sheet, or a heel part-corresponding unvulcanized foamed rubber sheet provided with openings which are to be inserted into the projections 28e, 28e corresponding only to the heel part is further stuck thereon, and an unvulcanized rubber piece for the circumferential member is stuck on the whole circumferential edge of the unvulcanized foamed rubber sheet 12a for the midsole part.

Figure 13C:
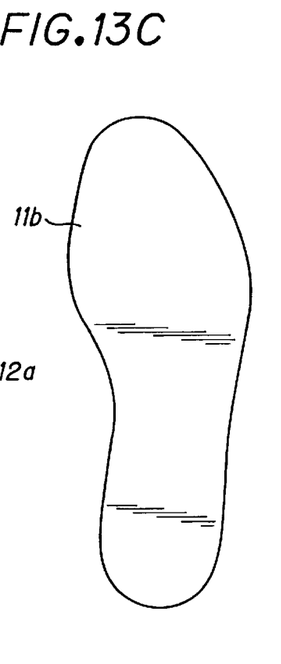
FIG. 13C is a plan view showing an unvulcanized foamed rubber sheet for an outsole.
Figure 14:
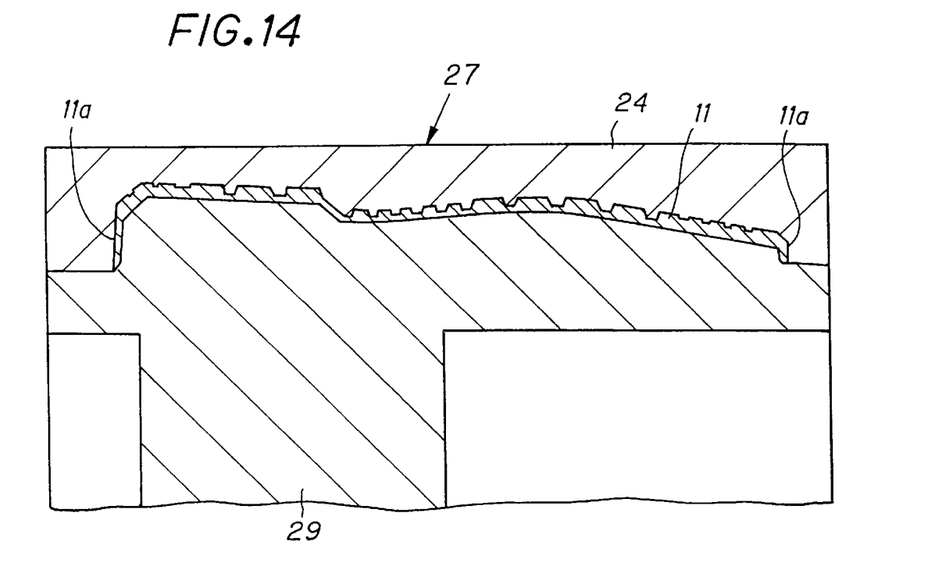
FIG. 14 is a cross-sectional view for explaining an initial production state of the safety shoe according to the process for producing a shoe of the present invention.

Next, as shown in FIG. 10 and FIG. 13C, an unvulcanized rubber sheet 11b comprising a rubber material having a high hardness is separately disposed on the fitting part 29b of the dummy last 29 for the outsole part and is introduced into the guiding part 23 in the die part 27 from the branch path 21b by means of the operating part 29a. As shown in FIG. 11 and FIG. 14, the upper die body 24 is moved downward, and the unvulcanized rubber sheet 11b is semi-vulcanized in the above die part 27 by heating it up to the vulcanizing temperature (about 150° C.) under applying pressure by means of the upper die body 24, the right and left die bodies 25, 26 and the dummy last 29 to mold it into a semi-vulcanized rubber sheet for the outsole part (vulcanizing time: 60 to 100 seconds).

Incidentally, the unvulcanized foamed rubber sheet 12a for the midsole part comprising a sponge rubber having a low hardness may be stuck on the back face of the gas permeable material 16 drawn into the last 28 described above during the semi-vulcanization molding.

Figure 15:
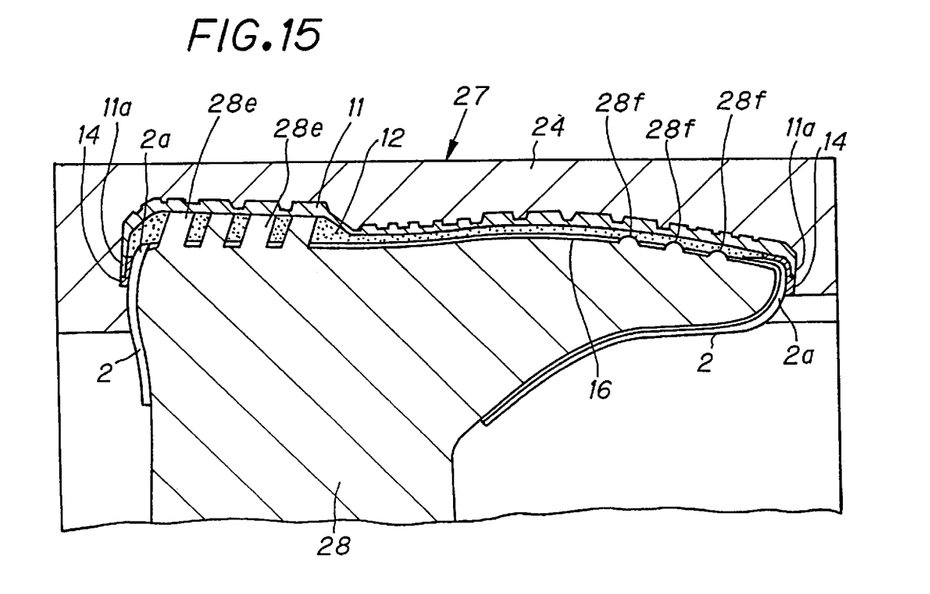
FIG. 15 is a cross-sectional view for explaining a latter half production state of the safety shoe according to the process for producing a shoe of the present invention.

Then, the preceding vulcanized rubber sheet for the outsole part is taken out of the die part 27 after the semi-vulcanization molding by quickly guiding the dummy last 29 from the guiding part 23 to the branch path 21b. Then, as shown in FIG. 10 and FIG. 15, the vamp 2 provided with the unvulcanized rubber sheet 12a for the midsole part drawn into the last 28 is guided from the branch path 21a into the guiding part 23 in the die part 27 by means of the operating part 28a. The semi-vulcanized rubber sheet for the outsole part 11, still in the die 24, is placed on the vamp 2 and is vulcanized and molded in the above die part 27 by heating it up to a vulcanizing temperature of about 150° C. under applying pressure (vulcanizing time: 8 to 10 minutes) by means of the upper die body 24, the right and left die bodies 25, 26 and the last 28, whereby the two-layer structure sole 10 having the heel part 13 is integrally molded by fusing. In addition, the upper circumferential edge 11a of the outsole part 11 is fused with the lower circumferential edge 2a of the vamp 2 via the circumferential member 14 comprising a rubber material having a high hardness by the vulcanization-molding described above to integrally mold them, and then the insole 4 is stuck thereon, whereby the safety shoe S shown in FIG. 1 is produced.

The vulcanizing temperature and the vulcanizing time in the vulcanization-molding described above are suitably controlled by the thicknesses of the outsole part 11 and the midsole part 12, and the like. The temperature in semi-vulcanizing the outsole part 11 is 140 to 170° C., and the time is 40 to 150 seconds. The vulcanizing temperature in the final step is 140 to 170° C., and the time is 5 to 12 minutes.

Produced by this production process is the safety shoe S shown in FIG. 1 to FIG. 9, comprising the toecap 1, the vamp 2, the insole 4, the two-layer structure sole 10, and the sole 10 has the outsole part 11 comprising a rubber material having a high hardness, and the midsole part 12 comprising a sponge rubber material having a low hardness laminated in the above outsole part 11, and is provided with the heel part 13. The above outsole part 11 and the midsole part 12 is fused integrally by vulcanization molding, and the upper circumferential edge 11a of the outsole part 11 is fused integrally with the lower circumferential edge 2a of the vamp 2 via the circumferential member 14 comprising a rubber material having a high hardness by the vulcanization molding described above. The midsole part 12 in the heel part 13 is thickly composed of a sponge rubber material having a low hardness and is provided with the plurality of through holes 15, 15 - - - .

In the production process according to the present embodiment, since a difference in an expansion coefficient between the outsole part 11 and the midsole part 12 and a difference in vulcanizing time therebetween are canceled by using the semi-vulcanized rubber sheet for the outsole part prepared by semi-vulcanizing the unvulcanized rubber sheet 11b comprising a rubber material having a high hardness in the die part 27, and foam gas generated in vulcanization molding is dispersed via the gas permeable material 16 provided on the whole back face of the vamp 2 and the gas guiding paths 28f, 28f - - - disposed on the last 28, a peeling phenomenon of the outsole part 11 from the midsole part 12 caused by the foam gas can be prevented, and the outsole part 11 and the midsole part 12 remain closely fused. In addition thereto, the upper circumferential edge 11a of the outsole part 11 is fused integrally with the lower circumferential edge 2a of the vamp 2 via the circumferential member 14 comprising a rubber material having a high hardness by the vulcanization molding described above, and therefore the safety shoe S provided with the two-layer structure sole 10 is produced only by the vulcanization molding. Accordingly, the working efficiency in the production steps is excellent, and the shoe can easily be produced at a low cost.

Since the heel part 28c in the last 28, an upper part of the front part 28d and the projections 28e, 28e are of a structure in which they are heated up to vulcanizing temperatures, vulcanization is carried out sufficiently even with a constitution of the thick heel part 13, and the outsole part 11 and the midsole part 12 are endowed with predetermined physical properties. In addition thereto, the plurality of through holes 15 for allowing air to flow are formed by the projections 28e, 28e in the midsole part 12 (sponge rubber material part) in the heel part 13 after production.

The present invention is constituted and carried out as described above. However, the present embodiment shall not be restricted to the example described above and can be changed to various embodiments within a range in which the scope of the present invention is not varied.

The safety shoe was explained in the embodiment described above, but the vamp 2 can be varied according to various uses to apply the preset invention to shoes other than the safety shoe, for example, sport shoes and hiking and mountain-climbing shoes. Uses or structures thereof other than the structure described above shall not specifically be restricted as long as the shoes have the structure described above.

The upper circumferential edge 11a of the outsole part 11 has been fused integrally with the lower circumferential edge 2a of the vamp 2 through the circumferential member 14 comprising a rubber material having a high hardness by the vulcanization molding, but the upper circumferential edge of the outsole part 11 or the midsole part 12 may be fused directly with the lower circumferential edge 2a of the vamp 2 by the vulcanization molding without interposing the circumferential member 14.

Further, the gas permeable material 16 has been used in the embodiment described above, but the insole 4 can be constituted out of a gas permeable material providing the structure described above and used.

Figure 16A:
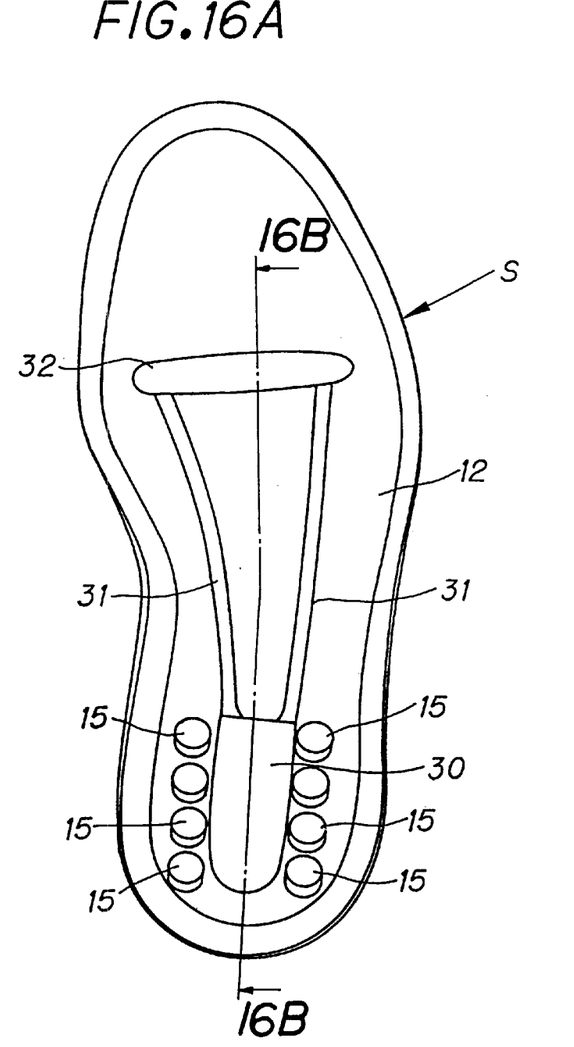
FIG. 16A a plan view showing an another example of the safety shoe produced by the process for producing a shoe of the present invention.
Figure 16B:
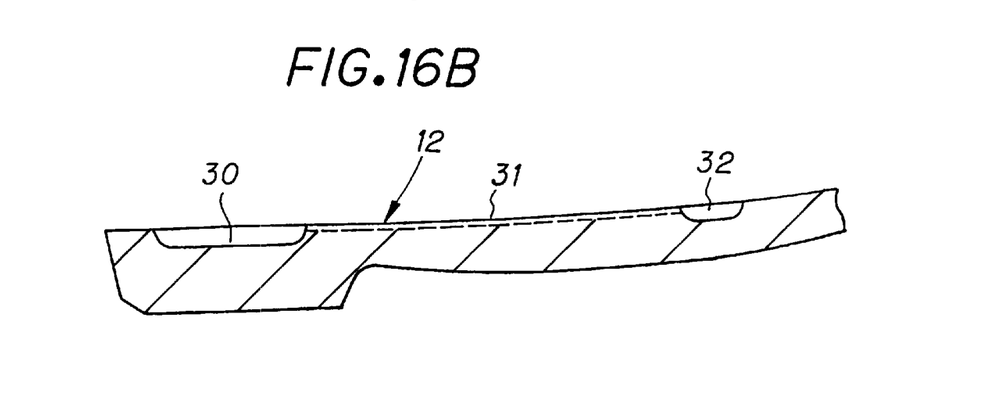
FIG. 16B is a cross-sectional view taken along X—X in FIG. 16A.

Further, as shown in FIGS. 16A and B, the gas guiding paths 28f - - - disposed on the last 28 may be formed so that a pump part 30, air flow paths 31, 31 communicating with the pump part 30, and an air vent part 32 provided at a terminal of the air flow paths 31, 31 are provided. Thus, a pump action is exerted on the midsole part 12 in walking merely by changing the form of the gas guiding paths 28f - - - , and air flow in a toe part and a heel part is more improved, which can further increase prevention of a hot and humid state.

What is claimed is:

1. A process for producing a shoe, comprising the steps of:

placing an unvulcanized foamed rubber sheet midsole part comprising a low hardness sponge rubber material on a back face of a gas permeable material provided on a back face of a vamp;

semi-vulcanizing at a temperature and for a period of time in a die an unvulcanized rubber sheet comprising a high hardness rubber material such that the unvulcanized rubber sheet is molded into a semi-vulcanized rubber sheet outsole part;

superposing said vamp provided with the unvulcanized foamed rubber sheet midsole part on said semi-vulcanized rubber sheet outsole part in said die; and vulcanizing at a temperature for a period of time in the die the semi-vulcanized rubber sheet outsole part and the unvulcanized foamed rubber sheet midsole part to form a sole comprising an outsole integrally fused to a foamed rubber midsole having a predetermined thickness, and to form the shoe comprising the upper circumferential edge of the sole integrally fused to the lower circumferential edge of the vamp solely by vulcanization;

wherein the temperature and the period of time for semi-vulcanizing combined with the temperature and the period of time for vulcanizing is sufficient to fully vulcanize the rubber sheet outsole part; and wherein the temperature and the period of time for vulcanizing is sufficient to simultaneously fully vulcanize the unvulcanized foamed rubber sheet midsole part without increasing the pre-determined thickness of the foamed rubber midsole.

2. The process for producing a shoe according to claim 1, wherein said process includes the step of providing a toecap to form a safety shoe.

3. A process for producing a shoe, comprising the steps of:

placing an unvulcanized foamed rubber sheet midsole part comprising a low hardness sponge rubber material on a back face of a gas permeable material provided on a back face of a vamp;

semi-vulcanizing at a temperature and for a period of time in a die an unvulcanized rubber sheet comprising a high hardness rubber material such that the unvulcanized rubber sheet is molded into a semi-vulcanized rubber sheet outsole part;

superposing said vamp provided with the unvulcanized foamed rubber sheet midsole part on said semi-vulcanized rubber sheet outsole part in said die; and vulcanizing at a temperature for a period of time in the die the semi-vulcanized rubber sheet outsole part and the unvulcanized foamed rubber sheet midsole part to form a sole comprising an outsole integrally fused to a foamed rubber midsole, and to form the shoe comprising the upper circumferential edge of the sole integrally fused to the lower circumferential edge of the vamp solely by vulcanization;

wherein the temperature and period of time for semi-vulcanizing is 140 to 170° C. for 40 to 150 seconds, and the temperature and period of time for vulcanizing is 140 to 170° C. for 5 to 12 minutes; and wherein the temperature and the period of time for semi-vulcanizing combined with the temperature and the period of time for vulcanizing is sufficient to fully vulcanize the rubber sheet outsole part; and wherein the temperature and the period of time for vulcanizing is sufficient to simultaneously fully vulcanize the unvulcanized foamed rubber sheet midsole part without increasing the pre-determined thickness of the foamed rubber midsole.

4. The process for producing a shoe according to claim 3 wherein said process includes the step of providing a toecap to form a safety shoe.

* * * * *